Dec. 27, 1949      E. W. HOLLAND      2,492,799
FISHHOOK EXTRACTOR
Filed July 5, 1947
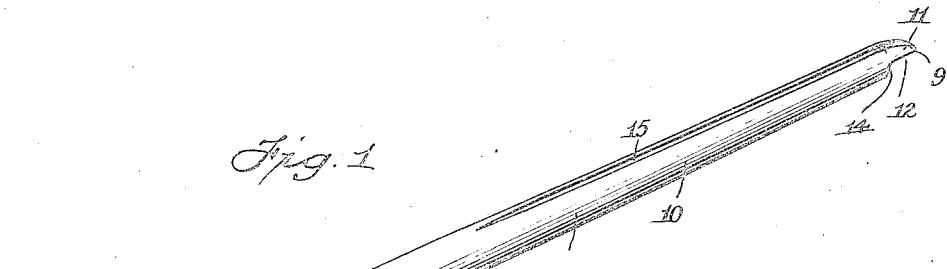
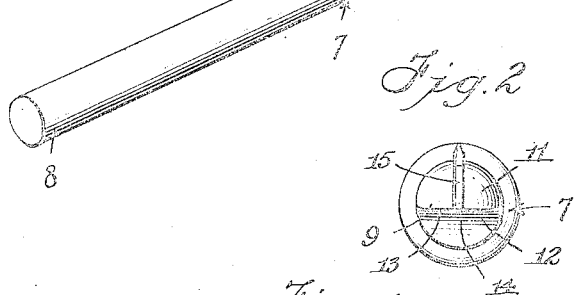
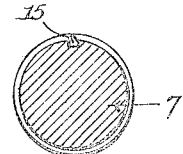
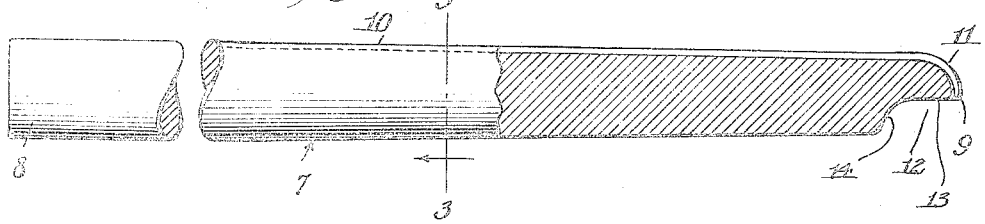
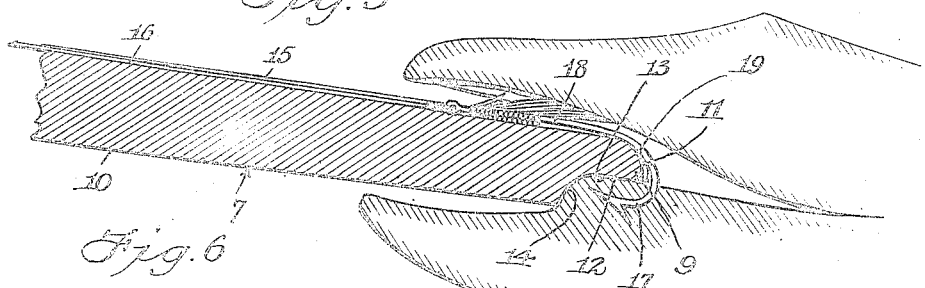
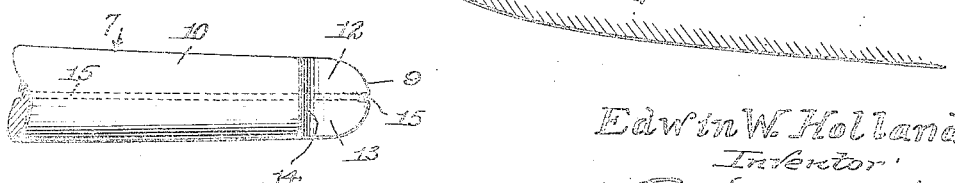
Edwin W. Holland
Inventor
By Emil Kernbach
Attorney Patented Dec. 27, 1949

2,492,799

UNITED STATES PATENT OFFICE 2,492,799

FISHHOOK EXTRACTOR

Edwin W. Holland, Collins, N. Y.

Application July 5, 1947, Serial No. 759,093

4 Claims. (Cl. 43—29)

My invention relates to a fish-hook extractor, or more particularly to a device for removing fish-hooks from fish when the hooks are taken in by the fish to a considerable depth and are difficult to remove by the hand only.

Fishermen often catch fish which are undersize and must be thrown back, also fish which retain a fighting spirit and struggle to free themselves while hooked or during the act of removing the fish-hook.

My improved device is so constructed that it is used both as a club, or what is sometimes referred to as a "priest" for stunning the fish, and as a means for disengaging the hook from the fish and protecting the fisherman from being pricked by the hook, or lacerated as sometimes occurs, during the act of removing the hook from the fish. Such a device also saves fish caught undersize so that they may be returned to the water in a condition which will enable them to thrive and grow.

One of the objects of my invention is to provide a fish-hook extractor wherein improved means is included to direct the device into the fish, using the fish line having the fish-hook secured thereto as a means of direct approach to the hook so that the latter may be freed from the fish without damaging the latter and without unnecessarily lacerating the flesh or an organ in the region of the fish in which the hook is caught.

Another object of my invention is the production of a device in the form of a slender object having means to co-act with a hook caught in a fish in a manner to disengage the hook under pressure exerted inwardly and which is of sufficient weight so that it may be conveniently used as a club or "priest" to stun a fish caught when resisting the fisherman's efforts to land the same.

A still further object is to provide a simple and inexpensive fishhook retriever, as it may also be termed, which has a pusher area adapted to engage or at least co-act with the bight of a fishhook to dislodge the latter from the flesh or other portion of the fish and wherein, adjacent said pusher area a guard is provided to protect the point of the hook and to prevent injury to the fisherman when he removes the hook with the extractor or retriever; also crowd the flesh behind the point of the fishhook downwardly so as to aid in withdrawing the hook without unduly lacerating the fish and to prevent the hook taking a new bite in the fish when withdrawing the extractor or retriever.

With the above and other objects in view to appear hereinafter, my invention consists in the novel features of construction and in the arrangement and combination of parts to be hereinafter described and more particularly pointed out in the subjoined claims.

In the drawings:

Fig. 1 is a perspective view of my improved fishhook extractor or retriever.

Fig. 2 is an enlarged view of that end of the device designed to be entered into a fish.

Fig. 3 is an enlarged cross section taken on lines 3—3, Fig. 4, looking in the direction of the arrow crossing said line.

Fig. 4 is a broken sectional elevation of the device shown enlarged over the scale shown in Fig. 1.

Fig. 5 is a longitudinal section of the operating or retrieving end of the device, showing the latter inserted into the mouth of a fish caught on a hook and the manner in which the pusher or pusher area of the device engages the bight of the hook and the guard protects the point of the latter.

Fig. 6 is a bottom view of the device as shown in Figs. 4 and 5.

The device is preferably constructed of wood of a kind that will provide sufficient weight to enable its use as a club for subduing a fish, or it may be constructed of aluminum, plastic, or other material suitable for such purpose. If desired, the device may be constructed of lighter weight material and used solely as a fishhook remover, extractor or retriever.

Regardless of the material from which it is constructed, it comprises a slender stick-like element or short rod 7 which is cylindrical from its inner or handle end 8 toward its outer end 9, which outer end may be termed its acting or operating end, for a distance approximately two-thirds of its length, from which point it is gradually reduced in size or tapered, as at 10, the outer or operating end of the stick-like element or rod 7 is rounded, as at 11, and cut away or notched through approximately one-half its diameter, as at 12. The rounded end 11 is, therefore, in the form of a quarter sphere since it is rounded in all directions from the plane of the top or overhanging wall 13 of notch 12 and its rounded surface serves as a pusher terminal or area to be used as hereinafter described.

The cut-away portion or notch 12 is directly beneath said pusher area or projecting nose as it may be termed, as viewed in Figs. 4 and 5, its top or overhanging wall 13 serving as the bottom of said projecting nose, or pusher as it may also be termed, and this cut-away portion has its inner end wall 14 inclined outwardly by rounding or concaving the same to merge at one end into said wall 13 and to terminate at its other end at the peripheral surface of the rod; thus the nose or pusher is substantially semi-circular in cross section. The length of the notch is greater than the distance between the bight and the point of the fishhook so that the point cannot come in contact with the said end wall, which latter may be referred to as an abutting wall or area.

A line groove 15 is formed in the stick-like element or rod from a point beyond the tapered portion 10 to the outer or operating end thereof, the groove being of even depth along the tapered portion of the stick-like element or rod and being gradually reduced in depth from the tapered portion toward the inner or handle end of the body portion so as to gradually vanish at the surface of the cylindrical portion because of the angularity of the peripheral surface of said tapered portion to the peripheral surface of said cylindrical portion.

When a fishhook caught in a fish is not easily removable with the fisherman's fingers, and particularly when the hook has been drawn deeply into the flesh or an organ of the fish and became caught in a region difficult to reach, the portion of the stick-like element or rod 7 having the operating or notched end 9 is thrust part way into the fish and when doing this the fish line, designated 16, to which the fishhook 17 is attached, is drawn taut and the stick-like element or rod moved farther into the fish parallel with the fish line while manipulating both the rod and the line so that the latter will enter the groove in the rod.

When drawing the fish line 16 taut the shank 18 of the fishhook will become alined with said line and the rounded area or pusher terminal 11 of the rod which overhangs the notch 12 will engage the bight 19 of the fishhook, as shown in Fig. 5.

With the parts so disposed, the point of the fishhook will be directed toward or against the inner curved end wall of the cut-away portion but will not contact the same and after thus positioning the rod, the line is maintained in taut condition in the groove of the rod by grasping both together and also against the outer cylindrical portion of the rod in some instances where a deep insertion of the rod is required. After the parts are so related under manipulation of the line and rod, it is only necessary to force the rod farther into the fish, which causes the curved inner end wall or abutting end of the notch to engage the flesh or organ of the fish in rear of the point of the fishhook and crowd the organ or flesh downwardly, thus aiding in preventing laceration of the fish and permitting easy withdrawal of the fishhook from the flesh or other portion of the fish engaged thereby. A reverse movement of the rod will then result in both the rod, line and hook being withdrawn without any possibility of the hook again entering any physical portion of the fish because of the point of the hook being guarded, nor is there any possibility of the fisherman becoming injured.

From the foregoing it will be apparent that the nose 11 will serve as a hook-pusher, while the concaved or otherwise rounded or inclined wall 14 at the inner end of the notch 12 will serve as an abutting or pusher region; and under the term "flesh" I include any organ or part of a fish in which a fishhook can be caught.

It is to be understood that the tapering of the rod is not essential, but the use of the same is believed to have advantages.

It will also be understood that it is a simple matter, after drawing the fish line taut while holding the hooked fish, to direct the line into the groove and the pusher terminal of the rod against the bight of the fishhook, while the point of the hook is being directed to confront the rounded or concaved end wall 14 of the cut-away portion or notch 12, hereinbefore referred to as abutting a pusher area or region.

Having thus described my invention, what I claim is:

1. A fishhook extractor, comprising a rod having a notch at one end shaped to form a projecting nose having a flat underside leading inwardly from the end of said rod and having at its inner end a downwardly and inwardly directed portion terminating at the periphery of the rod, said nose being adapted to engage the bight of a fishhook caught in a fish and said notch being of a length greater than the distance between the bight and point of the fishhook and adapted to receive the pointed end portion of the fishhook and protect the point thereof when positioning said projecting nose against the bight of the fishhook.

2. A fishhook extractor, comprising a rod having a notch at one end adapted to form a projecting nose having a rounded end conforming substantially to a portion of the bight of a fishhook and a flat underside leading inwardly from the end of said rod and having at its inner end an abutting area, said projecting nose being adapted to engage the bight of a fishhook caught in a fish and said abutting area being adapted to crowd the flesh or organ around the pointed end of the fishhook downwardly so as to aid in withdrawing said pointed end from the flesh or organ and prevent undue laceration of the fish.

3. A fishhook extractor, comprising a rod having a notch at one end through substantially one-half of its diameter to provide a substantially semi-circular pusher terminal overhanging said notch, the overhanging wall of said notch being flat and the outer end of said pusher terminal being rounded outwardly in all directions from the plane of said overhanging wall, the wall at the inner end of said notch being inclined and serving as an abutting area terminating at the periphery of said rod, said rod having a groove arranged lengthwise along that side of its outer surface opposite said notch to receive a fish line and the shank of a fishhook, the rounded end of said pusher terminal being adapted to bear against the bight of a fishhook in a fish with the pointed end portion of the fishhook positioned in said notch, said abutting area serving to crowd the flesh or organ of the fish around the point of said pointed end portion downwardly to prevent lacerating the fish while withdrawing the fishhook therefrom.

4. A fishhook extractor, comprising a rod having a notch at one end through substantially one-half of its diameter to provide a substantially semi-circular pusher terminal for the rod overhanging said notch, the overhanging wall of said notch being flat and the outer end of said pusher terminal being rounded outwardly in all directions from the plane of said overhanging wall, the inner end wall of said notch being concaved downwardly to serve as an abutting area terminating at the periphery of said rod, the rounded outer end of said pusher terminal being adapted to bear against the bight of a fishhook hooked in a fish, and the pointed end portion of the fishhook being positioned in said notch, said abutting area serving to crowd the flesh around said pointed end portion downward while withdrawing the fishhook from the fish.

EDWIN W. HOLLAND.

REFERENCES CITED

The following references are of record in the file of this patent:

UNITED STATES PATENTS

| Number | Name | Date |
|---|---|---|
| 1,611,544 | Maurus | Dec. 21, 1926 |
| 2,445,620 | Ketland | July 20, 1948 |